April 6, 1954 J. LAKOMSKI 2,674,045
CENTERING TOOL
Filed March 28, 1950 2 Sheets-Sheet 1
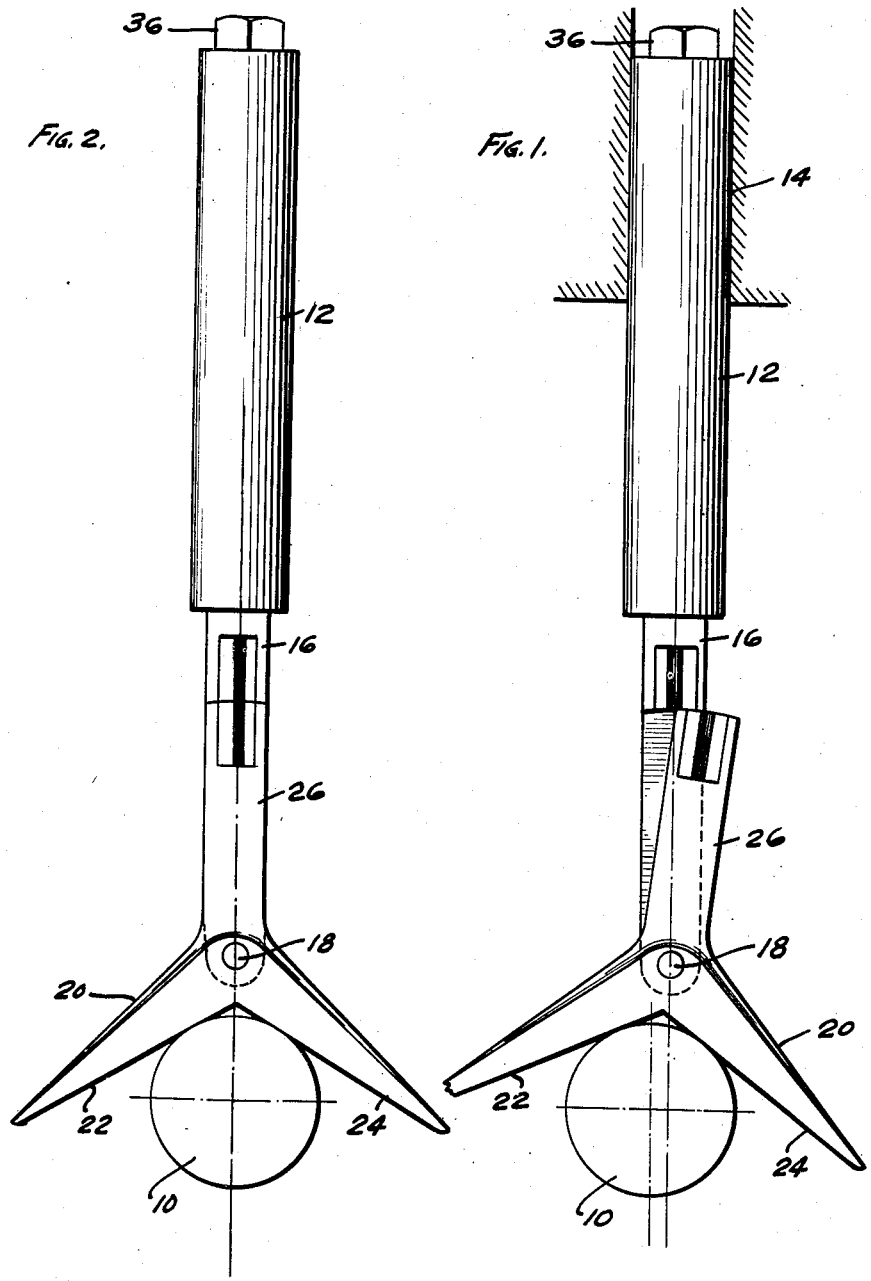
INVENTOR.
JOHN LAKOMSKI
BY
Harry N. Hitzeman
ATTORNEY April 6, 1954
J. LAKOMSKI
2,674,045
CENTERING TOOL
Filed March 28, 1950
2 Sheets-Sheet 2
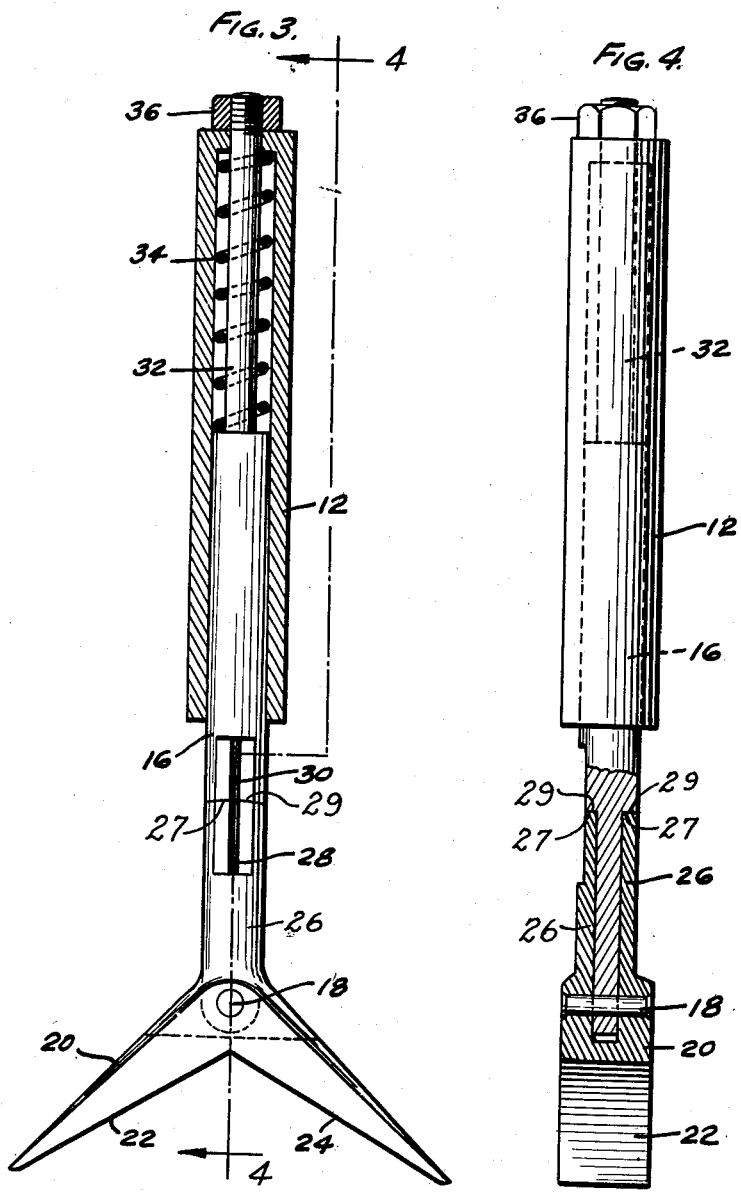
INVENTOR.
JOHN LAKOMSKI
BY
Harry H. Hitzeman
ATTORNEY.

Patented Apr. 6, 1954

2,674,045

UNITED STATES PATENT OFFICE 2,674,045

CENTERING TOOL

John Lakomski, Chicago, Ill.

Application March 28, 1950, Serial No. 152,376

1 Claim. (Cl. 33—172)

My invention relates to centering tools and like devices.

My invention relates more particularly to a centering tool of the type which will enable the center of a rotary object to be brought into a fixed plane so that further operations may be performed thereon, such for example as the drilling of holes through the center line or the cutting of keyways, slots, or the performing of other work which is necessary to be done in the vertical center line of the object such as a rod, shaft or similar work piece.

It is well understood that in centering tools or devices of the type described engaging surfaces must contact with opposed surfaces of the object to be measured, and while various devices of this type have heretofore appeared on the market, they have all been incapable of efficient and easy handling to secure the degree of accuracy necessary without the expenditure of a considerable length of time on the part of the mechanic or operator in securing the accuracy desired.

The principal object of the present invention is to provide an improved centering device of the type described by which the vertical center line of a shaft, rod or a similar object mounted in a machine tool can easily and quickly be ascertained.

A further object of the invention is to provide an accurate and easily operable centering tool of the type described provided with aligning indicia which quickly and easily indicate when the exact center alignment of the shaft below the chuck or other work holder has been accomplished.

Other objects and advantages will be more apparent from the following description wherein reference is had to the accompanying drawings, upon which Fig. 1 is a front elevational view of my improved centering tool showing the same in position over a shaft or similar work piece in a machine, the work being out of line below the chuck in the machine;

Fig. 2 is a changed position view showing the work in line and showing the manner in which the indicia on the centering tool are aligned when this condition exists;

Fig. 3 is a side elevational view of my improved centering tool; and

Fig. 4 is a vertical sectional view thereof taken generally on the lines 4—4 of Fig. 3.

In the embodiment of the invention which I have chosen to illustrate and describe the same, in Fig. 1 I have shown a shaft or other round work piece 10 in cross-section, the same being mounted in a vertical boring machine (not shown) so that a drilled or tapped hole may be made therein on the vertical center line.

The tubular housing member 12 of the centering tool is adapted to be received in the chuck 14 of the spindle of a vertical machine. It may telescopically receive a rod or support member 16 which carries a pivot 18 at its lower end upon which the forked work engaging member 20 is mounted.

The work engaging member 20 is made with a pair of accurately defined angularly disposed arms which have lower gauging surfaces 22 and 24, the angles upon which the two gauging surfaces diverge from the center line below the pivot 18 being exactly equal. The forked work engaging member 20 has a pair of spaced upwardly extending portion 26 one of which carries several vertically disposed grooves or marks 28 accurately aligned with the vertical center line of the member 20 so that when the indicium 28 is vertically aligned above the pivot 18, the circular work piece 10 is positioned directly below the pivot and the gauging tool has located the vertical center line for the work piece. The upper ends of the portion 26 are formed with the arcuate top edges 27 which engage complementary shoulders 29 on the support member 16.

The support member 16 is likewise provided with vertically aligned indicium 30 in the form of flattened marks or grooves, and when the indicia 28 and 30 are directly aligned and the tubular body member 12 is positioned in the chuck 14, the chuck will be directly in vertical alignment over the center line of the work piece. The centering tool can now be removed and a drill or other tool inserted in the chuck to make the bore or tap in the vertical center line of the work piece.

The support member 16, as previously mentioned, is telescopically mounted in the body 12, the support member having a reduced stem 32 about which a coiled spring 34 is mounted in the upper end of the body member. A nut 36 is attached to the end of the rod portion 32 to assemble the parts together. Thus, when the tool is applied to a work piece to center the same, the cooperating arcuate edges and shoulders 27 and 29 permit downward movement of the work engaging surfaces 22 and 24 against the tension of the spring member 34, and the work piece 10 can be moved laterally against this tension to accurately center the same to align the sets of grooves 28 and 30, at which time the work piece is of course centered directly below the center line of the vertical machine in which a tool is placed to drill, bore or run a key slot in the work piece.

From the above and foregoing description it can be seen that the centering tool which I have provided is constructed of very few parts and made in such manner that when the indicator elements are aligned there is no doubt about the location of the vertical center line of the work piece that is held in the machine.

Due to the simplicity of the parts and the small number of the same, it is evident that if these parts are accurately made and properly assembled, the closest of accuracy will be obtained when the same are used.

Having described my invention, what I claim is:

A tool for locating the vertical center line of a round work piece comprising a tubular housing member adapted to be fixedly received in the spindle of a vertical machine, said housing member having an open bottom end and a closed top end with a reduced axial opening therethrough, a rod slidably mounted in said opening and extending downwardly therefrom, said rod having a stem extending upwardly therefrom through the reduced opening in the upper end of said housing member, a nut secured to the end of said rod, a coiled spring in said housing member surrounding said stem and disposed between the closed end of said housing member and the upper end of said rod, the lower end of said rod cut away on both sides to form a flattened medial extension with an arcuate shoulder on both sides of said medial extension, a pin fastened in the lower end of said medial extension, a work engaging member mounted on said pin, said work engaging member having a forked upwardly extending portion encompassing the flattened medial extension of said rod and having arcuately shaped upper edges engaging the complementary shoulders on said rod, said work engaging member having a pair of angularly disposed gauging arms with contact surfaces on the lower sides of the same, said surfaces diverging from the center line of the work engaging member at equal angles, vertically aligned grooves in one face of said rod member extending upwardly from the arcuate shoulder thereon and grooves in one side of the forked upwardly extending portion of the work engaging member, both said sets of grooves adapted to be aligned when said rod is directly above the center of the work piece, said cooperating arcuate edges and shoulders permitting downward movement of said work engaging surfaces against the tension of said spring member and lateral movement of the work piece to accurately center the same therebelow to align said sets of grooves.

References Cited in the file of this patent

UNITED STATES PATENTS

| Number | Name | Date |
|---|---|---|
| 297,719 | Root | Apr. 29, 1884 |
| 893,427 | Bennett | July 14, 1908 |
| 1,395,087 | Brion | Oct. 25, 1921 |
| 1,422,746 | Couse | July 11, 1922 |
| 1,447,346 | Gilman | Mar. 6, 1923 |
| 1,630,476 | Erickson | May 31, 1927 |

FOREIGN PATENTS

| Number | Country | Date |
|---|---|---|
| 576,436 | Great Britain | Apr. 3, 1946 |
| 181,019 | Switzerland | Feb. 17, 1936 |